Dec. 2, 1952 A. C. PATCH ET AL 2,620,208
SEAL FOR AIRCRAFT CONTROLS
Filed Sept. 16, 1947 2 SHEETS—SHEET 1

INVENTORS:
ARTHUR C. PATCH
GARLAND P. PEED, JR.
JACOB C. COBIN

BY William R. Lane
ATTORNEY

Dec. 2, 1952    A. C. PATCH ET AL    2,620,208
SEAL FOR AIRCRAFT CONTROLS

Filed Sept. 16, 1947    2 SHEETS—SHEET 2

INVENTORS:
ARTHUR C. PATCH
GARLAND P. PEED, JR.
JACOB C. COBIN

BY *William R. Lane*
ATTORNEY

Patented Dec. 2, 1952

2,620,208

UNITED STATES PATENT OFFICE 2,620,208

SEAL FOR AIRCRAFT CONTROLS

Arthur C. Patch, Van Nuys, Garland P. Peed, Jr., Pacific Palisades, and Jacob C. Cobin, Hawthorne, Calif., assignors to North American Aviation, Inc.

Application September 16, 1947, Serial No. 774,318

2 Claims. (Cl. 286—15)

1

This invention relates to a universal mounting embodying a seal for a cable outlet in a wall separating high and low pressure areas.

The invention particularly relates to a universal mounting for a seal used in connection with cable outlets in a pressurized cabin.

In the past considerable difficulty has been experienced in satisfactorily sealing cable outlets and particularly where the cable or rod is mounted for lateral as well as longitudinal movement.

It is therefore an object of this invention to provide a mounting for a cable seal which not only permits the seal to perform its functions effectively but which also permits the rod or cable to move laterally as desired.

It is a further object of this invention to provide a mounting for a seal which is light in weight, simple in construction, and easy to install.

Other objects of the invention will become apparent from the following description and drawings, in which Fig. 1 is a cross-sectional view with parts in elevation showing the mount constructed in accordance with our invention;

Figure 1:
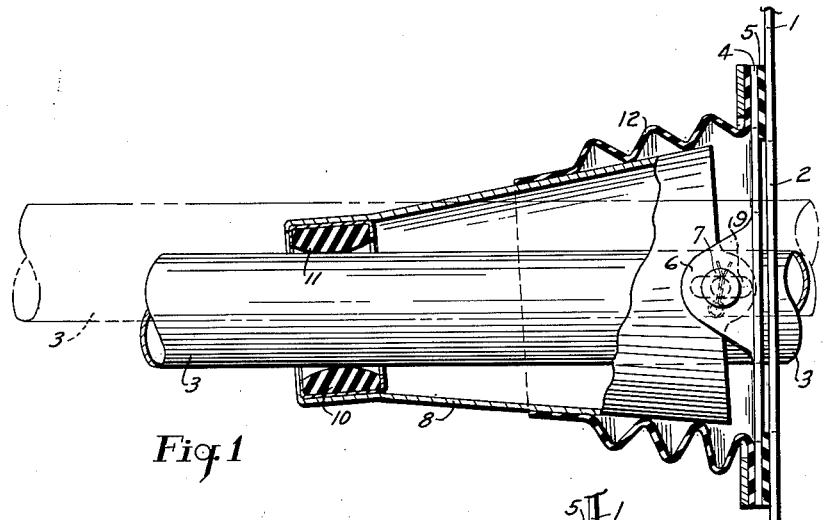

Referring to the drawings the wall 1 of a pressurized cabin is provided with an opening 2 for receiving a control rod 3, or the like, adapted for longitudinal as well as lateral movement. Attached to wall 1 by any suitable means (not shown) is a bracket 4 sealed with respect to the wall by gasket 5. Bracket 4 is provided with a pair of ears 6 adapted to receive pins 7 for rotatably and pivotally mounting sleeve 8 which in turn is provided with a slot 9 for receiving a pin 7. Sleeve 8 is provided with a sealing means 10. Such seal is rounded as at 11 to provide line contact with the rod 3. A boot 12, of rubber or other suitable material, is attached by any desired means to sleeve 8 at one end and to bracket 4 at the other end to enclose and seal the respective parts. In the operation of this embodiment of the invention, rod 3 may slide longitudinally with respect to the bracket 4 and seal 10. Vertical movement of the rod is permitted by reason of the pivotal mounting of sleeve 8 upon pins 7, whereas sideward movement of the rod with respect to the bracket is permitted by reason of the longitudinal slot 9 in member 8.

Figure 2:
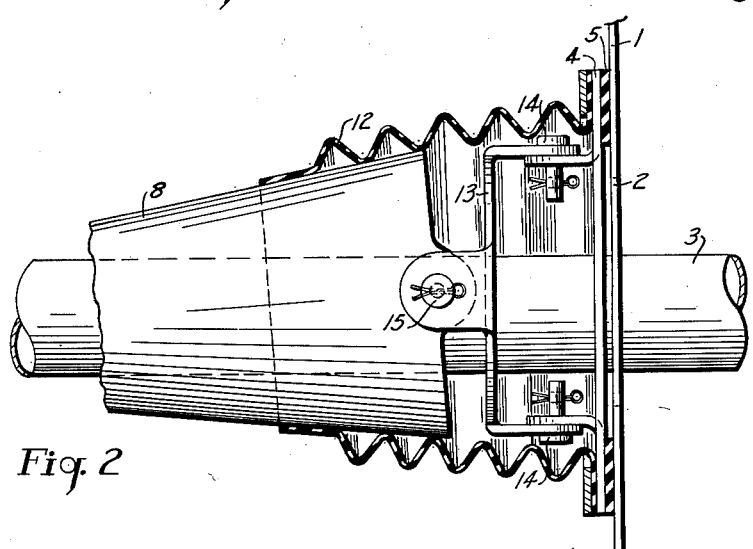
Fig. 2 is a top plan view with parts in section of a modified mount similar to that shown in Fig. 1.

Referring now to the embodiment of the invention illustrated in Fig. 2 there is provided an additional bracket 13 pivotally attached to bracket 4 by pins 14. Sleeve 8 in turn is pivotally attached to bracket 13 by pins 15 arranged at right angles to pins 14 to provide universal movement.

Figure 3:
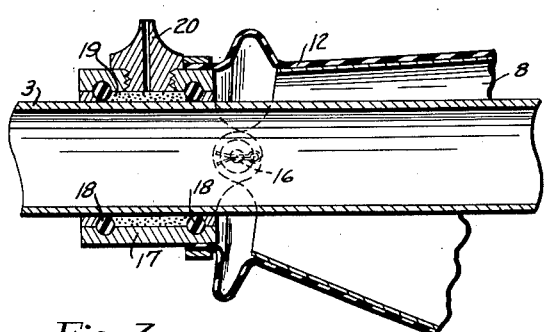
Fig. 3 is a part sectional view illustrating the invention in Figs. 1 and 2 with a modified form of sealing means.

Referring now to Fig. 3, sleeve 8 is pivotally attached by pins 16 to sealing means 17 comprising O rings 18 spaced to provide a lubricant seal 19. Member 17 is provided with a suitable lubricant fitting 20. In this embodiment of the invention the boot 12 extends into engagement with fitting 17. This arrangement of the invention provides an additional swivel for preventing deformation of the seal.

Figure 4:
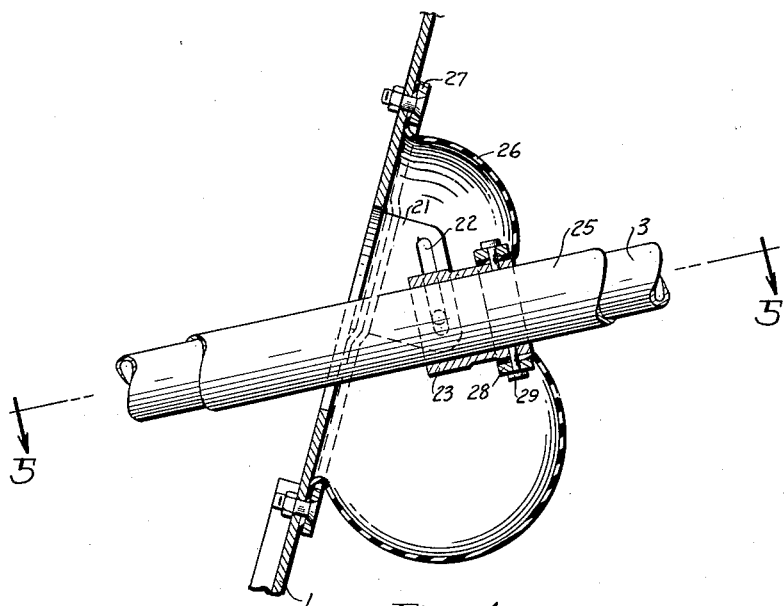
Fig. 4 is a modified form of the invention.
Figure 5:
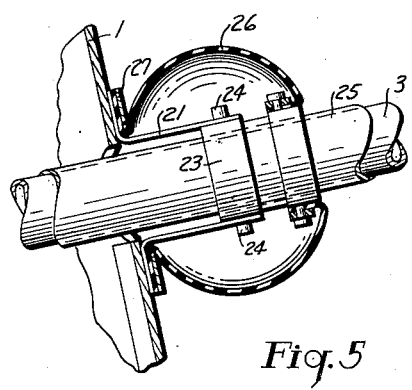
Fig. 5 is a view taken along the line 5—5 of Fig. 4.

Referring now to the embodiment of the invention illustrated in Fig. 4, bracket 21, suitably attached to wall 1, is provided with slots 22 for slidably and pivotally supporting sleeve 23 having pins 24 received in the slots 22. Although pins 24 are slidably received in slots 22 there is a certain amount of tolerance between these elements. A tube seal 25 of the type described and claimed in application Serial No. 719,233 filed December 30, 1946, now Patent No. 2,592,949 issued April 15, 1952, in the name of Joseph Philipson for Annular Type Cable Seal is attached to sleeve 23. Also attached to sleeve 23 is a boot 26 which in turn is also fastened to wall 1 to provide a seal between the outside of tube 25 and the wall. A ring 27 is adapted to fasten the outer periphery of the boot 26, as well as bracket 21, to wall 1. The inner periphery of the boot is fastened to the sleeve 23 by means of ring 28 and fastening means 29.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an aircraft pressurized cabin wall having an aperture therein for the passage therethrough of a control element, such as a rod or the like, having translatory and angular movement; a non-binding low-friction elongated sleeve extending through said aperture for slidably receiving said rod and closely fitted around said rod throughout the length of said sleeve so as not to entail appreciable loss of pressure therethrough; flexible membrane means surrounding said sleeve and sealingly attached thereto and to said wall for thereby sealing said sleeve with respect to said wall; and a bracket secured to said wall, said bracket including two oppositely disposed slots, said sleeve engaging said bracket in said slots for thereby mounting said sleeve on said wall with freedom for angular movement relative thereto.

2. In an aircraft pressurized cabin wall having an aperture therein for passage therethrough of a control element such as a rod or the like having translatory and angular movement; the combination of a rigid tubular sleeve closely fitted over said control element and adapted to guide said control element through said aperture, and of sufficient length to prevent flow of fluid therethrough; bracket means secured to said wall, said bracket means being provided with a pair of slots, said slots being disposed on diametrically opposite sides of said sleeve, said slots having straight parallel sides for engaging said sleeve and allowing lateral movement while restraining longitudinal movement thereof; and a flexible diaphragm interconnecting said sleeve and said wall for retaining different pressures on each side of said wall.

ARTHUR C. PATCH.
GARLAND P. PEED, JR.
JACOB C. COBIN.

REFERENCES CITED

The following references are of record in the file of this patent:

UNITED STATES PATENTS

| Number | Name | Date |
| --- | --- | --- |
| 1,051,025 | Spicer | Jan. 21, 1913 |
| 1,063,389 | Robbins | June 3, 1913 |
| 1,529,874 | Culbertson | Mar. 17, 1925 |
| 1,771,250 | Feild | July 22, 1930 |
| 1,983,368 | Hathorn | Dec. 4, 1934 |
| 2,196,676 | Johnson et al. | Apr. 9, 1940 |
| 2,349,507 | Mac Graham | May 23, 1944 |
| 2,413,671 | Wolf et al. | Dec. 31, 1946 |
| 2,441,206 | Pevney | May 11, 1948 |